(No Model.) 2 Sheets—Sheet 1.
L. CEREBOTANI.
APPARATUS FOR MEASURING DISTANCES.
No. 310,253. Patented Jan. 6, 1885.
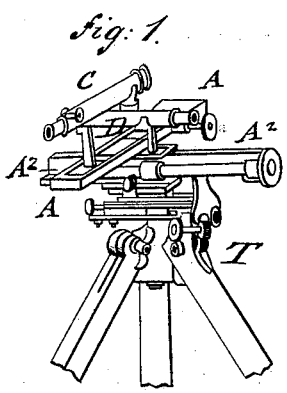
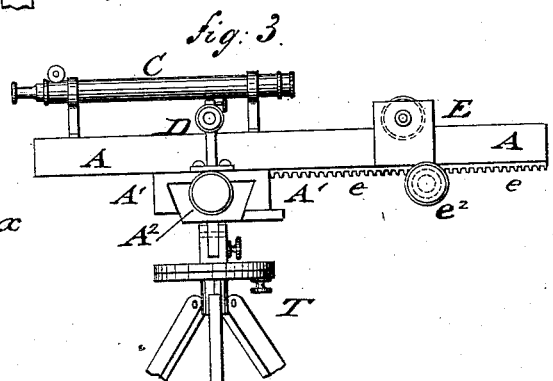
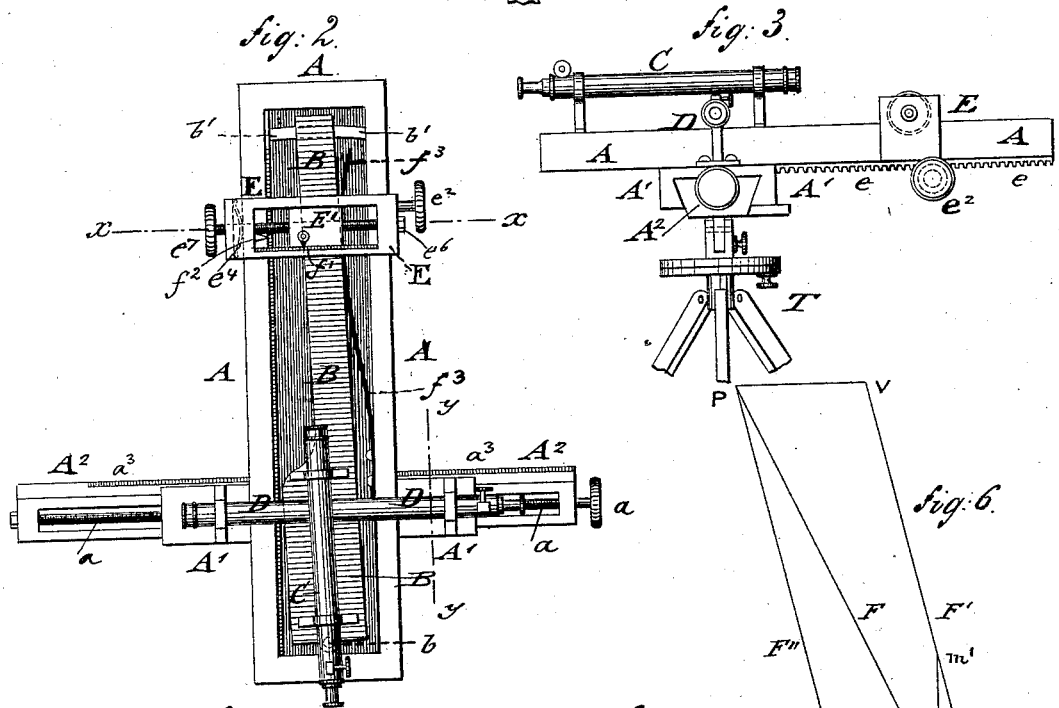
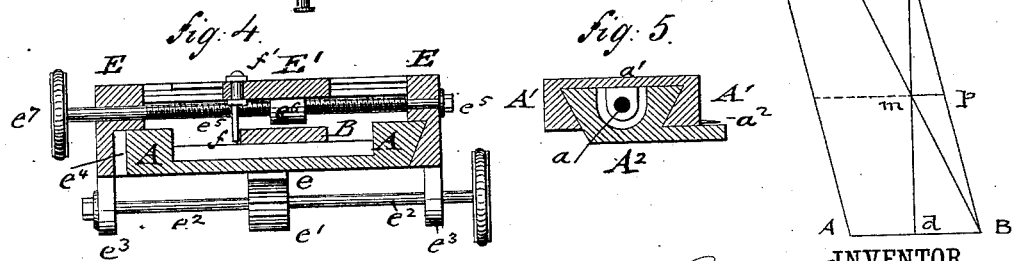
WITNESSES:
A. Schehl
Otto Risch
INVENTOR
Luigi Cerebotani
BY Goepel & Raegener
ATTORNEYS.

(No Model.) 2 Sheets—Sheet 2.
L. CEREBOTANI.
APPARATUS FOR MEASURING DISTANCES.
No. 310,253. Patented Jan. 6, 1885.
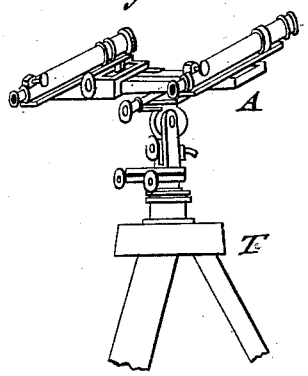
Fig. 7.
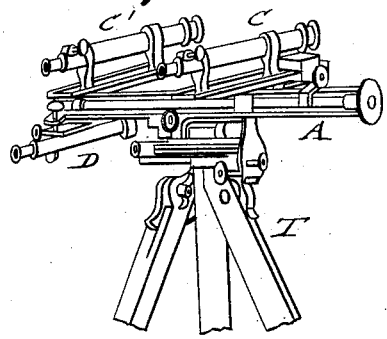
Fig. 8.
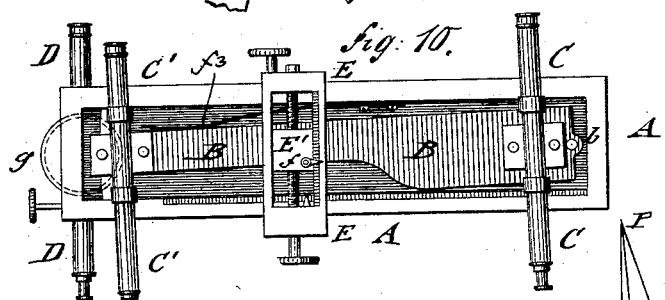
Fig. 10.
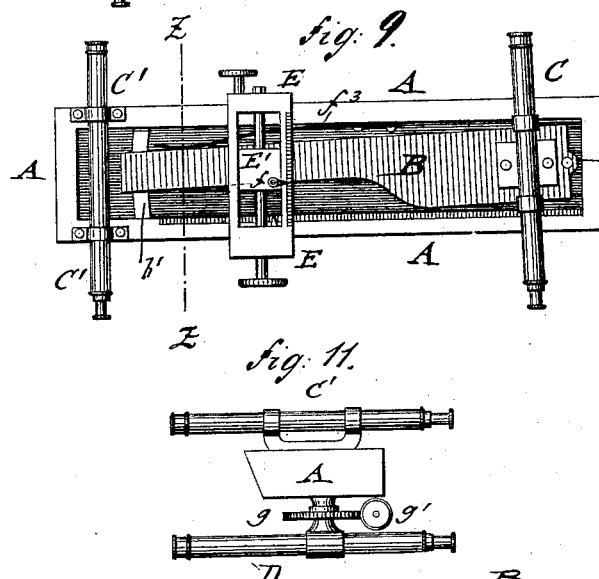
Fig. 9.
Fig. 11.
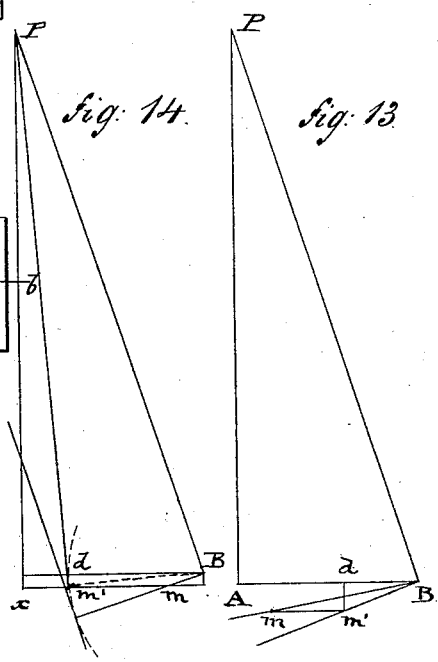
Fig. 14. Fig. 13.
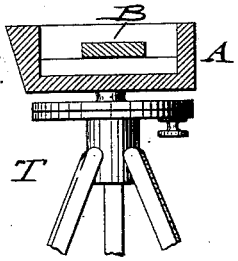
Fig. 12.
WITNESSES:
A. Schehl
Otto Risch
INVENTOR
Luigi Cerebotani
BY Goepel & Raegener
ATTORNEY

UNITED STATES PATENT OFFICE.

LUIGI CEREBOTANI, OF SAYN, PRUSSIA, GERMANY.

APPARATUS FOR MEASURING DISTANCES.

SPECIFICATION forming part of Letters Patent No. 310,253, dated January 6, 1885.

Application filed July 9, 1883. (No model.) Patented in Italy December 31, 1881, XXVII, 325; XV, 23,451; in Germany April 23, 1882, No. 20,635; in England December 1, 1882, No. 5,730; in France December 11, 1882, No. 152,565; in Belgium December 23, 1882, No. 59,960, and in Austria-Hungary January 30, 1883, No. 40,887 and No. 3,536.

*To all whom it may concern:*

Be it known that I, LUIGI CEREBOTANI, of Sayn, in the Kingdom of Prussia, German Empire, have invented certain new and useful Improvements in Apparatus for Measuring Distances, (which have been patented to me heretofore by the following governments: Germany, No. 20,635, dated April 23, 1882; Belgium, No. 59,960, dated December 23, 1882; France, No. 152,565, dated December 11, 1882; Austria, No. 40,887, dated January 30, 1883; Hungary, No. 3,536, dated January 30, 1883; Great Britain No. 5,730, dated December 1, 1882, and Italy, Vol. 27, No. 325, Vol. 15, No. 23,451, dated December 31, 1881,) of which the following is a specification.

In surveying, various apparatus for directly determining distances have been used heretofore; but the results obtained by the same were not so accurate and reliable that they could be successfully introduced into practical use.

The object of this invention is to furnish an improved apparatus whereby distances can be determined with a high degree of accuracy, without requiring the trigonometrical calculation of angles, the apparatus being based on elementary geometrical principles without a nonius, and adapted to work with a high degree of accuracy, provided the instrument itself is properly handled.

The invention consists of a supporting-box carrying a pivoted and spring-pressed ruler and a main telescope mounted thereon, an auxiliary controlling-telescope, and a movable slide guided on the box and connected by a laterally-movable slide-piece with the ruler, as will more fully appear hereinafter, and finally be pointed out in the claims.

In the accompanying drawings, Figure 1 represents a perspective view of the simplest form of my improved instrument for determining distances. Fig. 2 is a plan on a larger scale; Fig. 3, a side view. Figs. 4 and 5 are vertical transverse sections, respectively, on lines $x\ x$ and $y\ y$, Fig. 2. Fig. 6 is a diagram illustrating the principle upon which the instrument is based. Figs. 7 and 8 are perspective views of modified forms of the same apparatus. Figs. 9 and 10 are plan views of the apparatus shown in Figs. 7 and 8. Fig. 11 is an end view of the apparatus shown in Fig. 10. Fig. 12 is a vertical transverse section on line $z\ z$, Fig. 9. Figs. 13 and 14 are diagrams illustrating the principle upon which the instruments shown in Figs. 7 and 8 are based.

Similar letters of reference indicate corresponding parts.

In the drawings, A is an oblong box, of wood or other suitable material, in which is arranged a longitudinal ruler, B, that is pivoted at one end to a pin, $b$, of the box A, while its opposite end is guided along an arc-shaped guide-piece, $b'$, of box A. A telescope, C, is supported in fixed standards of the ruler B, the axis of the telescope being in line with one edge of the ruler B, as shown clearly in Fig. 2. The box A is guided by a grooved transverse piece, A′, affixed to its bottom on a dovetailed guide-piece, $A^2$, that is supported in any approved manner upon a tripod, T, as shown in Figs. 1 and 3. The box A is adjusted on the cross-piece $A^2$ by means of a longitudinal screw-bolt, $a$, that engages a fixed screw-nut, $a'$, of the guide-piece A′, as shown in Figs. 2 and 5. A fixed pointer, $a^2$, on the slide-piece A′ indicates on a scale, $a^3$, arranged at the edge of the cross-piece $A^2$, the distance which the box A has traversed over the cross-piece $A^2$ by the screw-bolt $a$. A controlling-telescope, D, is supported on fixed standards of the guide-piece A′, so as to pass below the main telescope C transversely across the box A, and in line with the axis of the slide-piece A′. On the longer end of the box A is guided a slide-frame, E, which is moved in longitudinal direction over the same by means of a longitudinal rack, $e$, attached to the under side of the box A, and engaged by a pinion, $e'$, of a transverse shaft, $e^2$, that turns in bearings of lugs $e^3$, applied to the sides of the slide-frame E. The slide-frame E is retained at any point to which the same is set by its actuating mechanism by the friction of a band-spring, $e^4$, that is interposed between the box A and one side of the slide-frame E. The opposite side of the slide-frame E is guided in a tapering recess along the opposite dovetailed side of the box A. The slide-frame E is provided at its top part with an oblong opening, the longer transverse sides of which are provided with ways for guiding a transverse slide-piece, E', that is operated by means of a threaded rod, $e^5$, passing through a fixed screw-nut, $e^6$, at the under side of the slide-piece E', said screw-rod $e^5$ turning in bearings of the slide-frame E, and having a milled head, $e^7$, at one end.

To the transverse slide-piece E' is applied a downwardly-extending pin, $f$, the lower end of which is recessed at that side facing the edge of the ruler B to such an extent that the edge of the ruler is in line with the axis of the pin $f$, as shown clearly in Figs. 3 and 4. The pin $f$ is provided at the other end with a pointer, $f'$, that moves along a scale on the slide-frame E, which is also provided with an index, $f^2$, that moves along a scale at the inner edge of the box A, as shown in Fig. 2. When the slide-frame E is adjusted on the box A in one or the opposite direction, the ruler B and telescope C follow the motion of the same—the former because it is always kept in contact with the pin $f$ by means of a band-spring, $f^3$, that is attached at one end to the box A, and the free end of which presses on the ruler B.

The instrument is used as follows: The main telescope C is first directed toward the object whose distance is to be determined. An object in line with the visual axis of the controlling-telescope is next sighted and carefully noted. The slide-frame E is then moved for a determined distance, and a sight then taken through the controlling-telescope. If the object before sighted is not in the visual axis of the telescope, it is brought into the same by turning the stand. The slide-piece A', and with the same the box A and both telescopes C and D, are next moved to the left on the cross-piece $A^2$ by turning the screw-rod $a$ until the visual axis of the main telescope C is brought again into line with the object the distance of which is to be determined. The controlling-telescope remains during this motion in line of its visual axis.

The distance which the slide-piece A' moves on the cross-piece $A^2$ is read off and the distance of the sighted object determined in the following manner, which will be perfectly clear by reference to Fig. 6: If F F' F² are the three different positions of the main telescope C, and $m$ $m'$ the distance through which the slide-frame E has been moved, then the following elements are known: $dm$, $dm'$, $d\mathrm{B}$, and AB, which latter is equal to PV, $dm' - dm = mm'$.

$$dm' : d\mathrm{B} :: mm' : mp \therefore mp = \frac{d\mathrm{B} \times mm'}{dm'}.$$

Then from the known elements of the triangle $dm\mathrm{B}$, $m\mathrm{B}$ can be determined, and in the triangles PVB and $m\mathrm{B}p$, according to the proportion $mp : m\mathrm{B} :: \mathrm{PV}$ or $\mathrm{AB} : \mathrm{PB} \therefore \mathrm{PB} = \frac{m\mathrm{B} \times \mathrm{AB}}{mp}$.

To facilitate the different operations, previously-computed tables are used, which are based on the different distances through which the slide-frame may be moved, by which the distance of any object within sight of the main telescope can be quickly ascertained from the tables.

In the apparatus shown in Figs. 8 and 10 an auxiliary principal telescope, C', is used, which is, like the telescope C, supported on standards of the ruler B, transversely across the same and parallel to the telescope C, as shown in Fig. 10. The controlling-telescope D is supported below the box and adjustable on its axis in any direction at will. In this case the slide-frame E is also moved through a determined distance and the sight taken through the telescope C to the point the distance of which is to be determined. The controlling-telescope D is then sighted to the same point by the worm-gear $g$ $g'$, provided for it, so that the two axes of the telescopes C and D meet in the same point. A sight is then taken through the telescope C', and simultaneously the slide-frame E moved until the thread-cross of the telescope C' coincides with the point in question. A sight is then taken through the controlling-telescope D to ascertain whether a slight deviation has taken place. If it has deviated from the former sight-line, it is corrected. A sight is now again taken through the telescope C', and so on until the sight-lines of the telescopes C' and D meet in the point the distance of which is to be determined.

From the tables prepared for this apparatus the distance is instantly determined by means of the known elements, which are read off on the scales of the instrument. The tables are based on the diagram shown in Fig. 14, in which the distance $xp$ is determined from the known right-angle triangles $x\mathrm{P}m'$ and $m'\mathrm{B}d$, in which the elements $d\mathrm{B}, dm', m'x$ are known; consequently $dm' : d\mathrm{B} :: xm' : x\mathrm{P} \therefore x\mathrm{P} = \frac{d\mathrm{B}, xm'}{dm'}$.

The instrument shown in Figs. 6 and 8 is provided with two telescopes only, of which the main telescope C is rigidly fixed to the ruler B and the auxiliary telescope C' to the box A. In this case the two telescopes are only parallel to each other when the ruler B is in line with the zero-point on the scale of the slide-frame E. In this case the controlling-telescope D is dispensed with and the telescope C made use of as such.

The instrument is operated as follows: The point in question is first sighted through the telescope C' by turning the box A on its stand, then by looking through the main telescope C and moving the slide-frame until the thread-cross of the telescope C coincides with the point whose distance is to be determined. A sight is then taken through the telescope C' to ascertain whether it has deviated. It is then brought back to the point in view by turning at the stand, and so on alternately until both telescopes coincide in the distant point. The distance of the pin $f$ from the pivot of ruler B is then read off and the distance determined from the tables, based on the diagram shown in Fig. 13, in which, in the two right-angled triangles APB and $m'Bd$, the elements AB, $dm'$, $dB$ are given, so that $$m'd : dB :: AB : AP \therefore AP = \frac{dB \times AB}{m'd}.$$

With the apparatus described distances up to one thousand meters can be read off with considerable accuracy, while by the aid of a third telescope, as shown in Figs. 8 and 10, much greater distances can be read off with considerable accuracy.

The instruments are of comparatively simple construction and easily operated, and the distance of the object from the instrument determined by the tables on the basis of the known elements read off on the scales of the instrument.

Having thus described my invention, I claim as new and desire to secure by Letters Patent—

1. An apparatus for measuring distances, which consists of a supporting-box mounted on a tripod, a longitudinal ruler pivoted at one end to the box, a principal telescope mounted on said ruler, a controlling-telescope supported in standards of the supporting-box, and a longitudinally-movable slide-frame having a laterally-traversing slide-piece and index-pin, the latter forming contact with the edge of the ruler, substantially as set forth.

2. In an apparatus for measuring distances, the combination of a supporting-box mounted on a transverse guide-piece, means for laterally adjusting the box on said guide-piece, a longitudinal ruler pivoted at one end to the box, a principal telescope mounted on said ruler, a controlling-telescope mounted on the supporting-box, a longitudinally-movable slide-frame guided on the box and having a laterally-traversing slide-piece carrying an index-pin, the latter forming contact with the edge of the ruler, substantially as set forth.

3. In an apparatus for measuring distances, the combination of a supporting-box mounted on a tripod, a longitudinal ruler pivoted at one end to the box, a principal telescope mounted on said ruler, an auxiliary telescope mounted on said box, a controlling-telescope supported in bearings of the box, a longitudinally-movable slide-frame guided on said box, and a laterally-traversing slide-piece guided in said slide-frame and provided with an index-pin, forming contact with the edge of the ruler, substantially as set forth.

In testimony that I claim the foregoing as my invention I have signed my name in the presence of two subscribing witnesses.

LUIGI CEREBOTANI.

Witnesses:
JAS. HENRY SMITH,
CARL ED. HALY.